United States Patent
Johnson et al.

(10) Patent No.: US 6,308,245 B1
(45) Date of Patent: Oct. 23, 2001

(54) ADAPTIVE, TIME-BASED SYNCHRONIZATION MECHANISM FOR AN INTEGRATED POSIX FILE SYSTEM

(75) Inventors: David Leroy Johnson, Pine Island; Michael Lawrence Nordstrom; John Christopher Ripstra, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,136

(22) Filed: May 13, 1999

(51) Int. Cl.[7] ..................................................... G06F 12/12
(52) U.S. Cl. .......................................... 711/159; 707/201
(58) Field of Search ................................... 711/112, 154, 711/159, 160; 707/200, 201

(56) References Cited

U.S. PATENT DOCUMENTS 5,897,640 * 4/1999 Veghte et al. ......................... 707/202

OTHER PUBLICATIONS

IBM TDB, "Enforced Delayed Synchronization for Mapped Files", Iss. 5, vol. 29, Oct. 1986, p. 2334.*

* cited by examiner

Primary Examiner—Kevin L. Ellis
(74) Attorney, Agent, or Firm—Lawrence D. Maxwell

(57) ABSTRACT

Synchronization software in a computer operating system evaluates with respect to an exposure goal the ages of byte stream files queued for synchronization, and dynamically adjusts synchronization ("sync") capacity in response to the evaluation. The synchronization of byte stream files occurs at rates responsive to the sync capacity. Several parameters are used to adjust sync capacity: a lead time, the number of active sync tasks, and the priority of the sync tasks. These parameters are adjusted in a manner to impact system performance to the least extent possible.

30 Claims, 8 Drawing Sheets

ADAPTIVE, TIME-BASED SYNCHRONIZATION MECHANISM FOR AN INTEGRATED POSIX FILE SYSTEM

BACKGROUND OF THE INVENTION

1. Field of the Invention

The present invention relates generally to computer operating system file handling mechanisms and, more specifically, to synchronization of changed pages of data in memory to disk or other permanent storage.

2. Description of the Related Art

Synchronization is the process by which the operating system of a computer, typically a minicomputer or mainframe, from time to time writes out to disk or other non-volatile direct access storage device (DASD) pages of data in main memory that have been altered by the operation of an application program. (For convenience, the term "disk" is used herein to refer to all such DASD and other non-volatile storage devices, but the actual storage medium may be other than a disk.) Synchronization is important because it minimizes the likelihood that data will be irretrievably lost in the event of a catastrophic system crash resulting from, for example, a power outage. Minicomputers and mainframes typically do not respond to an application program altering data in main memory by immediately writing the altered pages of data to disk. Rather, they typically let the data age for some amount of time before writing the altered pages to disk because it enhances system performance. Severe I/O bottlenecks would occur in system performance if data in memory were always immediately written to disk in response to an application program altering the data.

There is a well-known tradeoff between writing changed pages immediately to disk and delaying or aging changed pages. The advantages of greater delay or aging include greater utilization of main memory, bundling multiple changes to the same page into a subsequent input/output (I/O) operation to disk and, because I/O devices usually write sequential or closely located blocks as a single I/O operation, a fundamental reduction in overall system I/O. The advantages of less delay include maximizing data recovery from system crashes and preventing main memory from becoming over-committed. Once main memory has become over-committed, caching additional data in main memory forces other data out of main memory.

A synchronization daemon is a software process or job controlled by the operating system that performs the synchronization task in the background, i.e., transparently from the perspective of a user. The daemon, in accordance with an algorithm, sweeps changed pages out to disk and updates metadata such as file allocation size and the offset of the end-of-file. A prior synchronization daemon that has been included in versions of the IBM OS/400 operating system alternated between five minute intervals of inactivity or "sleep" and intervals in which it would "wake up" and perform synchronization. The operating system maintained a synchronization list ("sync list") that listed all files that had been changed since the last synchronization. Such pending changes included both actual data and metadata. The operating system placed a file on the sync list after ten writes to that file had occurred or at the time the file was closed. A disadvantage of this approach is that when the daemon woke up after its five minute sleep interval, it caused a significant strain on available system resources. A spike of CPU and I/O activity occurred at regular five minute intervals, thus degrading the response time of applications using the system. Another prior synchronization daemon that has been included in another version of the IBM OS/400 operating system attempted to alleviate this problem by waking up every 15 seconds and then only performing synchronization of files in the sync list during a subsequent interval comprising one second of CPU time before going back to sleep. During the awake interval, it swept as many changed pages as possible to disk before returning to sleep. When it again woke up, it resumed the process of synchronizing files on the list where it had left off. If it reached the end of the list before the end of the one-second interval, it returned to the top of the list and continued synchronizing any unsynchronized files until the end of the one-second interval. Although this method reduced the size of the spike in system resources, it unnecessarily limited the time that files remained unsynchronized or "exposed" in main memory. It also made no distinction between files that had been changed very recently and files that had been changed as much as fifteen seconds earlier.

It would be desirable to provide a synchronization mechanism that does not cause a spike in system resources and that is adaptable to system conditions. These problems and deficiencies are satisfied by the present invention in the manner described below.

SUMMARY OF THE INVENTION

The present invention relates to synchronization software in a computer operating system that evaluates with respect to a predetermined exposure goal the ages of byte stream files queued for synchronization, and dynamically adjusts synchronization ("sync") capacity in response to the evaluation. The synchronization of byte stream files occurs at rates responsive to the sync capacity. It is believed that the synchronization mechanism is operating optimally when synchronization is sufficiently spread over time that it does not cause spikes in the system workload and, on average, the age of files being synchronized neither exceeds nor falls short of the exposure goal.

When the software detects alteration of a byte stream file in main memory, it adds information identifying the byte stream file to a synchronization list. The altered byte stream file is placed on this list or queue because it needs to be synchronized to direct-access storage, i.e., it is exposed. A system operator or similar user can specify an exposure goal, which represents the length of time within which the user prefers synchronization of each byte stream file to be completed.

At predetermined intervals, the software performs an evaluation, and may initiate synchronization of one or more byte stream files in the synchronization list. During the evaluation, the software determines the age of a file in the synchronization list, i.e., the amount of time elapsed since the file was placed in the synchronization list. If the file is relatively old, the result of the evaluation may be to increase synchronization capacity. If the file is not old, the result may be to decrease synchronization capacity. For example, if the age of the file is more than a certain percentage less than the exposure goal, then the software may decrease synchronization capacity. In an exemplary embodiment of the invention, the evaluation considers not only the age of the file relative to the exposure goal, but also whether the goal of synchronizing files within the exposure goal is improving. For example, if the age of the file is more than a predetermined percentage greater than the exposure goal, i.e., synchronization is lagging, and there is not at least a certain percentage improvement between the age of this file and the age of the file evaluated during the previous evaluation, then the software may increase synchronization capacity. Synchronization capacity determines, in essence, the speed or rate with which files are synchronized after they are altered.

Adjusting synchronization capacity may, for example, be performed by increasing or decreasing the priority of a synchronization task, or by increasing or decreasing the number of such tasks. Synchronization may be adjusted in other ways in addition to or alternatively to these ways. For example, a variable that adds a bias or lead time to the exposure goal may be adjusted. In an exemplary embodiment, the adjustments are made in accordance with an algorithm that makes the least aggressive type of adjustment predicted to meet the exposure goal.

During the evaluation interval, the software initiates synchronization of one or more of the byte stream files in the synchronization list. For example, in an embodiment of the invention in which independently executing synchronization tasks are used to perform the synchronization, the software may send a message to be received by one of these tasks that identifies a byte stream file to be synchronized. If the file is old relative to the exposure goal, then the software initiates synchronization of that file, and during the evaluation interval may initiate the synchronization of other files in the synchronization list that are old relative to the exposure goal. If the file is not old relative to the exposure goal, then the software may defer initiating its synchronization until, for example, a later evaluation period, or until the age of the file approaches the exposure goal. The process of evaluating the age of a file and initiating synchronization of files is then repeated during the next evaluation interval.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
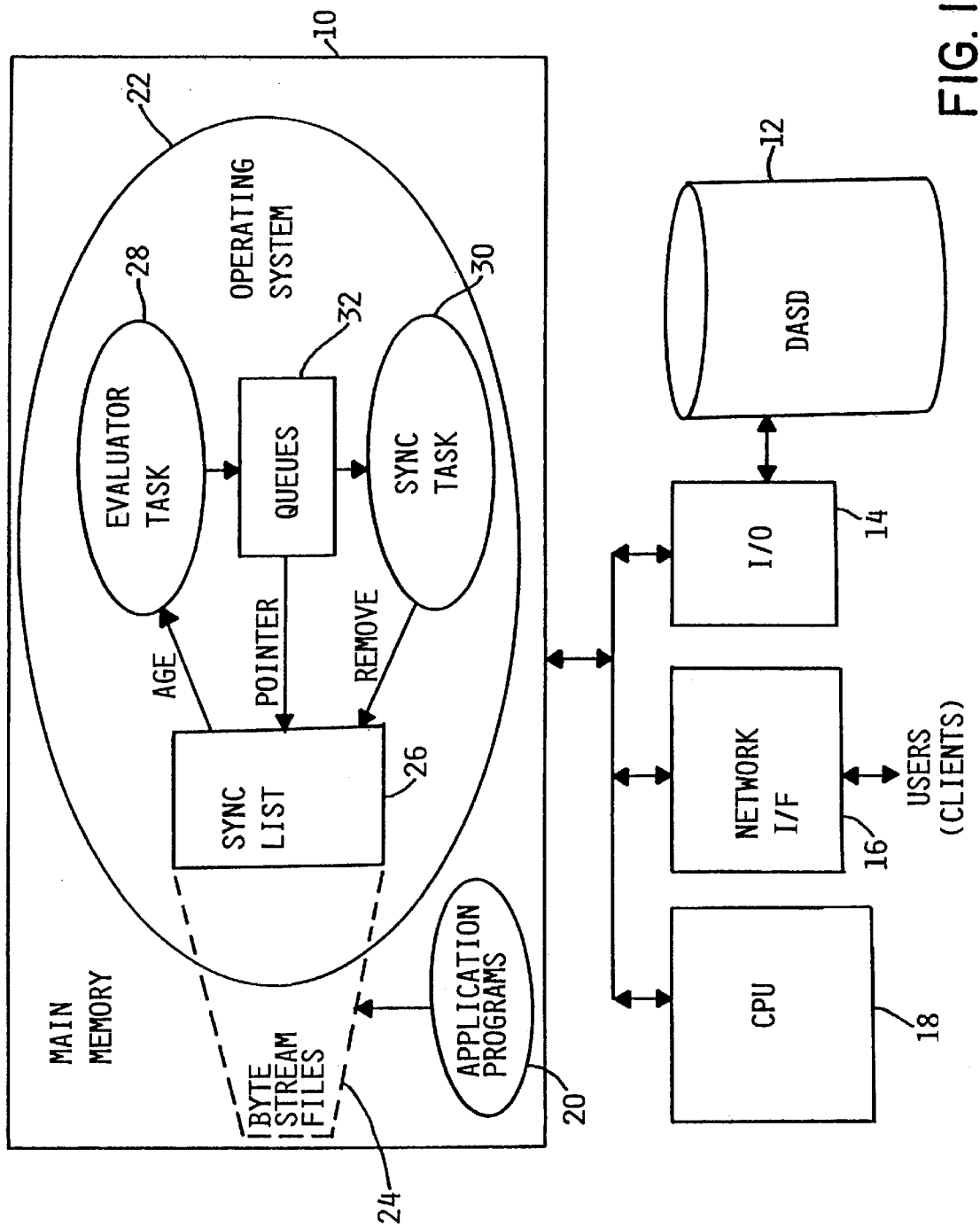
FIG. 1 is a block diagram illustrating a computer system in which the operating system includes the synchronization mechanism of the present invention.

As illustrated in FIG. 1, a computer system includes a main memory 10, a direct-access storage device (DASD) 12, input/output logic 14, network interface logic 16, and central processing unit (CPU) logic 18. These elements are connected to one another via one or more busses in the conventional manner. The logic of these elements may be implemented in hardware, software or a combination of both, e.g., firmware, as well-known in the art. The computer system includes other elements, both hardware and software, but only these elements are illustrated for purposes of clarity in describing the present invention. The computer system is preferably an IBM AS/400 server. Nevertheless, the present invention is applicable to any suitable computer system. Similarly, although the file system of the computer to which the present invention relates is preferably an integrated POSIX file system, the present invention may be used in conjunction with any suitable file system.

In accordance with the client-server environment, the computer system communicates with one or more client computers (not shown) via network interface 16. Via their client computers, users can control the execution of application programs 20. Although application programs 20 are illustrated for purposes of clarity and convenience as residing and executing in main memory 10, it is understood by those skilled in the art that in the client-server environment a corresponding client program, which may be considered to be a portion or element of the application program, resides and executes in the memory of the client computer. It is also understood by those skilled in the art that although application programs 20 are illustrated for purposes of clarity and convenience as residing in their entirety in main memory 10, the computer system, under the control of CPU logic 18, will typically retrieve from DASD 12 or elsewhere and execute only a portion of a program at a time. Indeed, the computer system retrieves and executes essentially any software program in this manner. For purposes of this patent specification, all software elements and data referenced below behave in this manner unless specifically stated otherwise.

An important software element of the computer system is its operating system 22. As those skilled in the art can appreciate, operating system 22 is complex and multi-faceted and provides many functions that, for purposes of clarity, are not described or illustrated in this patent specification. One such function, however, relates to the management and storage of files. Perhaps the most common type of file that operating system 22 must manage is a byte stream file (BSF) 24. In an AS/400 computer system, when a program writes to a file or reads from a file residing in memory, that file is most commonly a byte stream file. With reference to FIG. 1, application programs 20 can write to BSFs 24 residing in memory 10 as well as read from BSFs 24 and perform other operations on BSFs 24. A BSF in memory typically reflects a page or other portion of the same file stored in a non-volatile medium. When application programs 20 change or alter a BSF, the alteration is not reflected in the copy of that file in DASD 12 until the computer system synchronizes the BSF, or normal paging writes the file to DASD.

To facilitate synchronizing BSFs 24 in accordance with the present invention, operating system 22 includes a sync list 26, an evaluator task 28, one or more sync tasks 30 and one or more queues 32. In the illustrated embodiment, these elements and others that are described in further detail below pass messages between each other in accordance with queueing theory, as is well-known in computer systems. As understood by those skilled in the art, the computer system provides mechanisms that allow programmers to write software elements that are asynchronous tasks that communicate with each other via queues. Queues 32 represent one or more suitable queues that function in this manner. A preferred queue arrangement is described below with respect to FIG. 3. Nevertheless, although queuing is preferred, in other embodiments, sync list 26, evaluator task 28, sync tasks 30 and other elements may communicate with each other in any suitable alternative manner.

Figure 2:
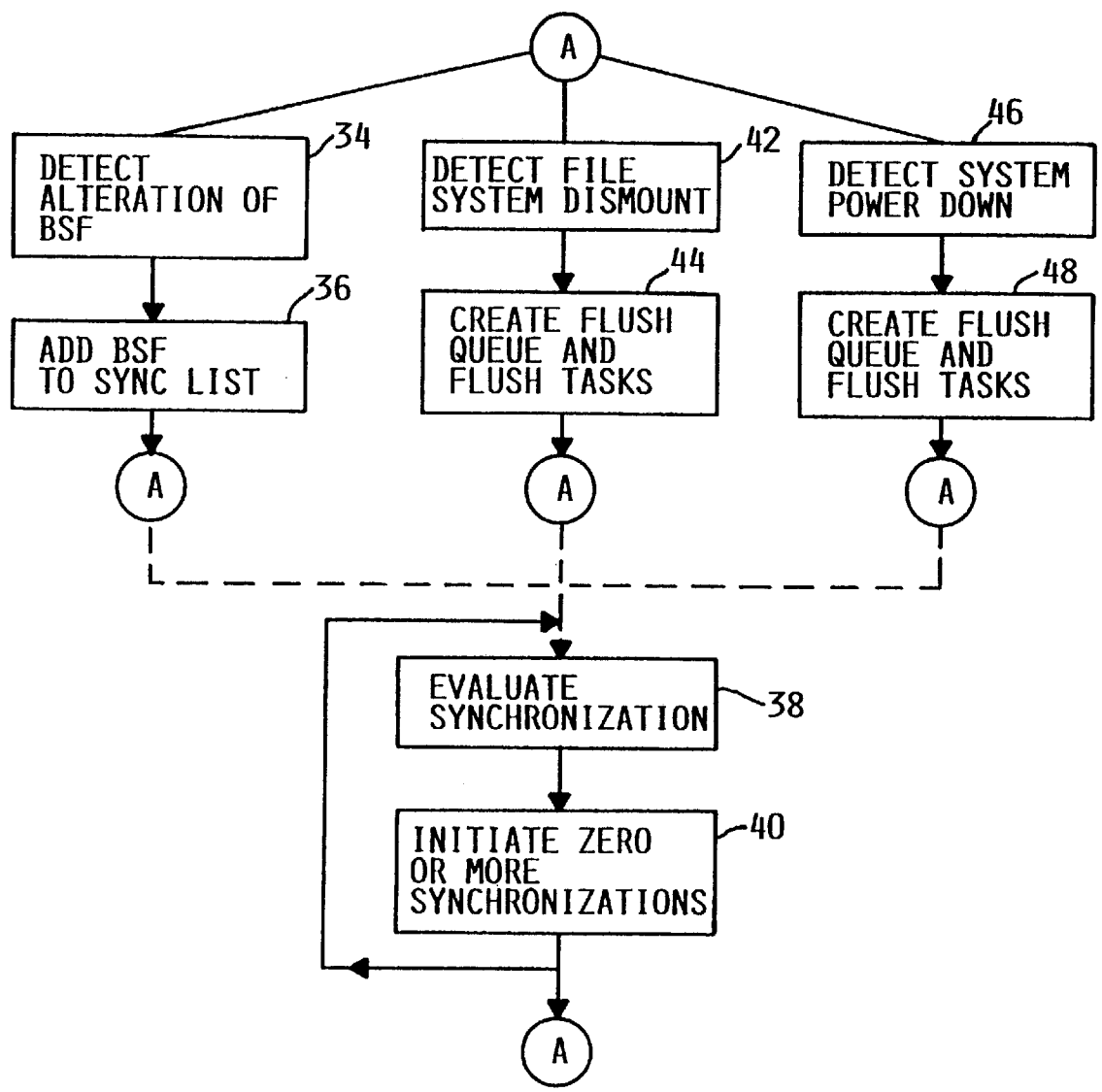
FIG. 2 is a flowchart illustrating the synchronization methods of the present invention.

With further reference to the flowchart of FIG. 2, a step of the synchronization process occurs when an alteration of a BSF 24 is detected at step 34. The operating system includes a conventional storage management mechanism or object (not shown in FIG. 1) that monitors changes in files and, in response to detection of such a change, can execute software methods provided by a system programmer. In accordance with the present invention and well-known system programming practices, the programmer can provide such a method that causes BSF 24 to be added to sync list 26 at step 36. Steps 34 and 36 are preferably performed in accordance with operating system code that is invoked when application program 20 performs a write operation, and the steps described below are preferably performed separately by other, asynchronous or independent tasks. Nevertheless, in other embodiments the steps may be performed in other combinations or in other orders by any suitable tasks or software elements. Furthermore, the connectors labeled "A" in FIG. 2 are intended to illustrate that, while the synchronization method of the present invention can readily be described as a complete sequence of steps, the steps between the connectors "A" can be performed by tasks or other software elements functioning independently of one another and, depending upon the timing of asynchronous events, which is for all intents and purposes unpredictable, the actual processing by the computer system can begin at any connector "A" and then begin again at any other connector "A".

At intervals that are predetermined or set by the system programmer, such as every 30 seconds or other suitable amount of time, an evaluation is performed. At step 38 evaluator task 28 determines whether synchronization capacity should be increased, decreased or left unchanged, and adjusts the synchronization capacity accordingly. The manner in which evaluator task 28 makes this evaluation and adjusts synchronization capacity are described in further detail below. At step 40 evaluator task 28 initiates a number of synchronizations that can be from zero to the maximum number that it has time to initiate before the next evaluation interval begins. The manner in which evaluator task 28 determines whether to initiate another synchronization is also described in further detail below. Note that in the illustrated embodiment synchronization occurs in response to step 38 because sync task 30 responds to the initiation of synchronization by performing the synchronization. Nevertheless, in other embodiments synchronization may occur in response to step 38 for other reasons and in accordance with other suitable mechanisms. The evaluator task repeats steps 38 and 40 during each evaluation interval.

Although steps 34, 36, 38 and 40 describe the synchronization method, additional steps are included in the preferred system. Steps 42 and 44, which are preferably performed in accordance with a method provided by the system programmer in the operating system write code, detect a file system dismount and, in response, create a flush queue (not shown in FIG. 1) and flush tasks (not shown in FIG. 1). Similarly, steps 46 and 48, which are preferably performed in accordance with a method provided by the system programmer in another operating system mechanism, detect power down of the computer system and, in response, create a flush queue (not shown in FIG. 1) and flush tasks (not shown in FIG. 1). The flush task and flush queue are described below.

Figure 3:
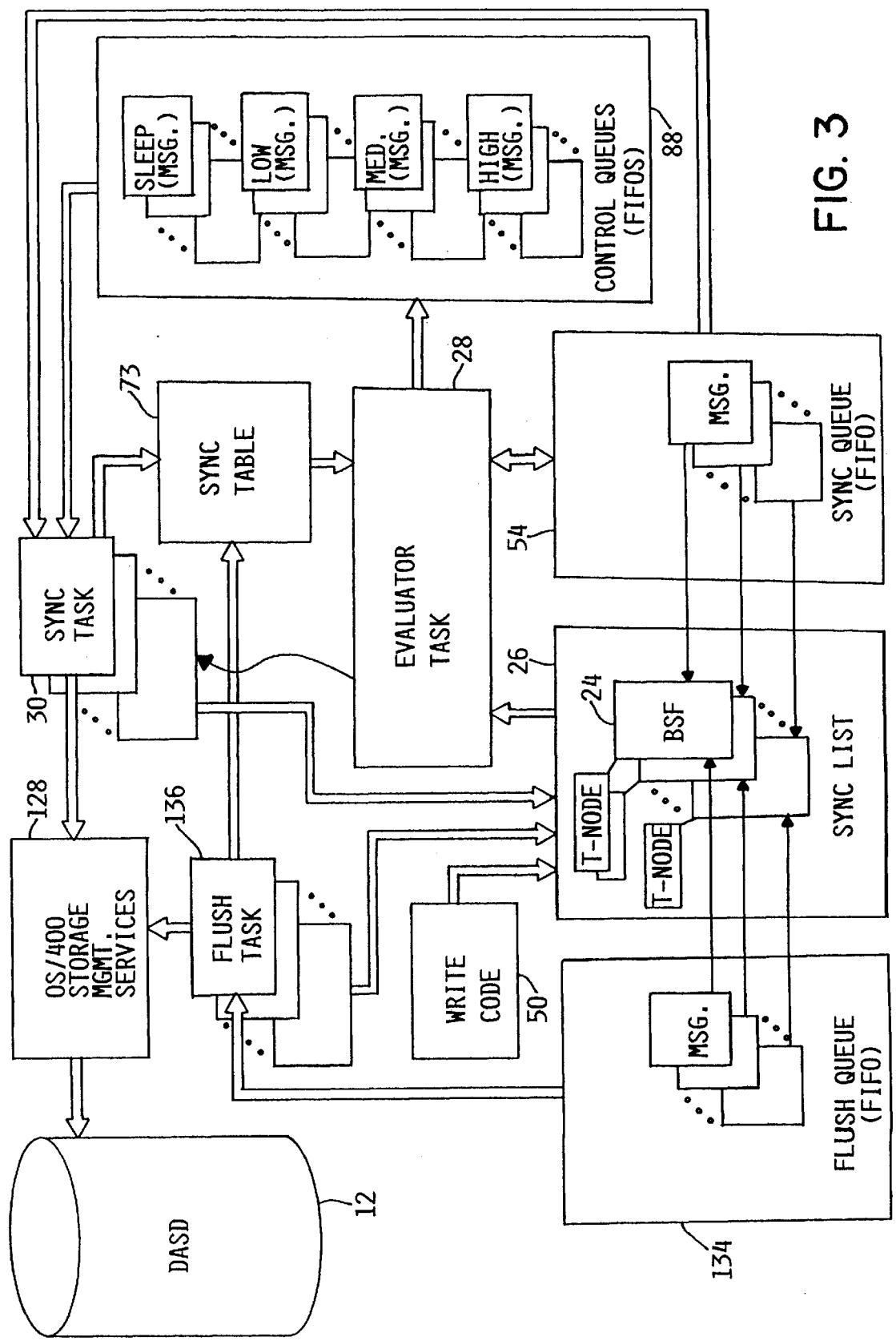
FIG. 3 is a block diagram illustrating the elements of the synchronization mechanism.

The exemplary synchronization system is illustrated in further detail in FIG. 3. The write code 50 of the OS/400 operating system includes a method provided by the system programmer that detects alteration of BSF 24 in memory 10 (FIG. 1) and, in response, adds information identifying the altered BSF 24 to sync list 26, as indicated above with respect to steps 34 and 36 (FIG. 2). In FIG. 3, BSF 24 is illustrated for purposes of clarity and convenience in a manner that suggests it is contained within sync list 26, and by adding information such as an address identifying its location in memory 10 it is effectively included within sync list 26. Sync list 26 is preferably implemented as a doubly linked list of BSFs 24. Each BSF 24 has associated with it an object referred to as a T-node which contains information about the current state of the file. The method that causes BSF 24 to be added to sync list 26 also causes a time-stamp to be stored in the associated T-node. This marks BSF 24 as being exposed and thus requiring synchronization.

Figure 4:
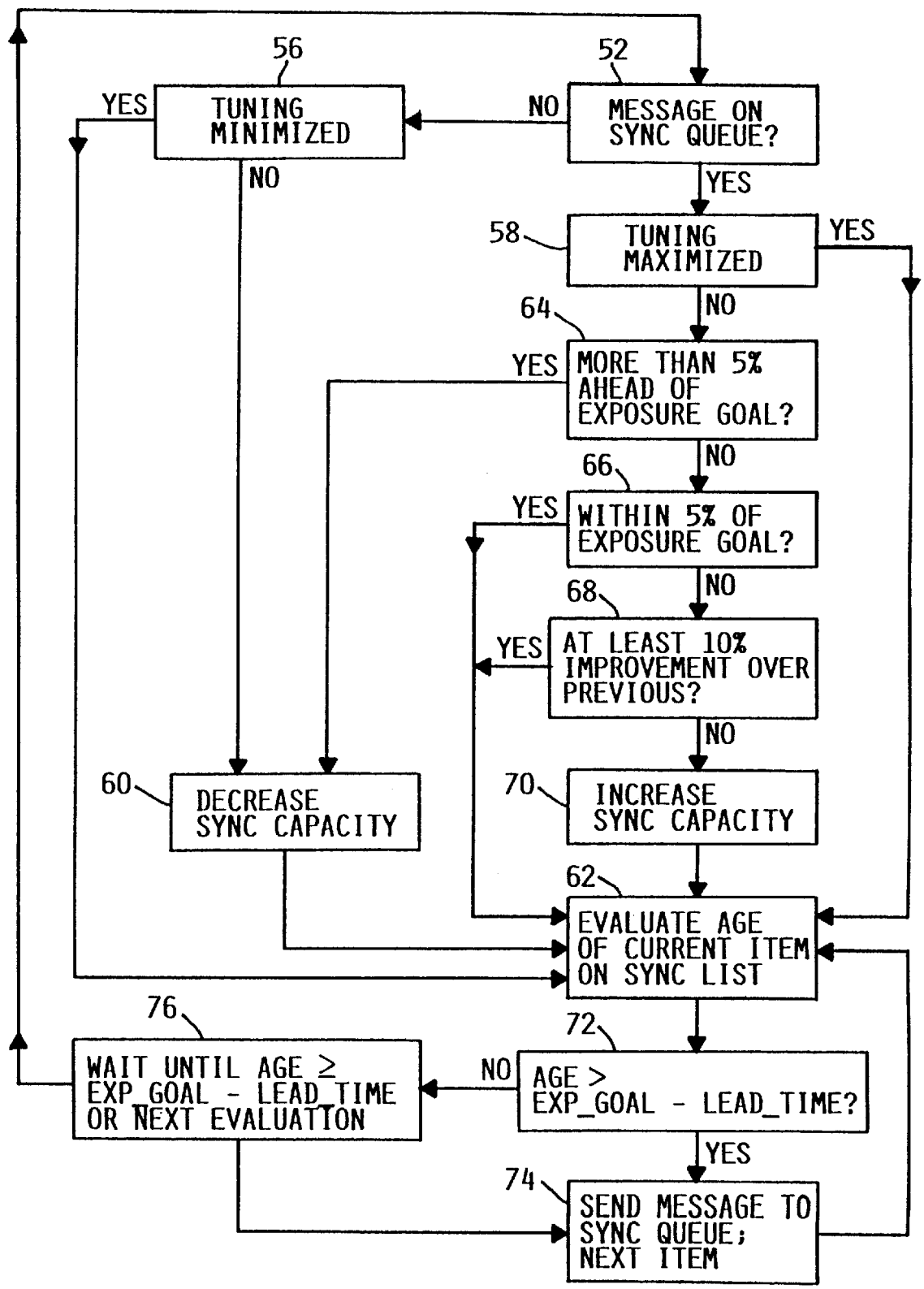
FIG. 4 is a flowchart illustrating the operation of the evaluator task of FIG. 3.

The operation or functionality of evaluator task 28 is illustrated by the flowchart of FIG. 4. At step 52 evaluator task 28 determines whether a message exists in the sync queue 54. Each message in sync queue 54 points to a corresponding BSF 24 in sync list 26. The absence of a message in sync queue 54 indicates that no synchronization is required.

If no message exists, evaluator task 28 determines whether tuning or adjustment of the sync capacity has been minimized by checking the state of a tuning__minimized flag at step 56. If a message exists, evaluator task 28 determines whether tuning has been maximized by checking the state of a tuning__maximized flag at step 56. These flags provide optimization by bypassing steps that are unnecessary if sync capacity cannot be further adjusted because the adjustment parameters have already been adjusted to their maxima or minima.

If no message exists in sync queue 54 and tuning is not minimized, evaluator task 28 decreases sync capacity at step 60 because these criteria indicate that the rate at which synchronization is occurring can likely be slowed without falling behind the rate at which new BSFs 24 are being added to sync list 26. Processing then continues at step 62. An important precept of the present invention is that synchronization should impact the workload of the computer system to the minimal extent possible. For this reason, sync capacity is reduced whenever possible. If no message exists in sync queue 54 and tuning is already minimized, then processing proceeds directly to step 62.

A message in sync queue 54 indicates that synchronization is required. If a message exists in sync queue 54 and tuning is already maximized, evaluator task 28 proceeds directly to step 62. If a message exists in sync queue 54 and tuning is not maximized, evaluator task 28 determines how to adjust the sync capacity. At step 64 evaluator task 28 determines whether synchronization has been occurring ahead of the exposure goal. The exposure goal is a parameter input by the computer system operator or similar personnel that indicates the length of time in which it is desired to complete synchronization of each BSF 24 added to sync list 26. A typical value is, for example, five minutes, but in selecting an exposure goal one may consider various factors, such as anticipated system workload.

With reference to step 64, evaluator task 28 determines the age of the BSF 24 that was least recently added to sync queue 54, i.e., the BSF 24 at the bottom of the FIFO. Age is computed by determining the difference between the timestamp in the T-node associated with that BSF 24 and the time of day. If evaluator task 28 determines at step 64 that the age of that BSF 24 is more than five percent ahead of the exposure goal (or stated another way, the exposure goal exceeds the age of BSF 24 by more than five percent), evaluator task 28 decreases sync capacity at step 60. If, however, the age of that BSF 24 is not more than five percent ahead of the exposure goal, then it may be desirable to maintain or even increase sync capacity. In that event, at step 66 evaluator task 28 determines whether the age of the BSF 24 is within (i.e., plus or minus) five percent of the exposure goal. If the age is within five percent of the exposure goal, evaluator task 28 proceeds to step 62 because a deviation of less than five percent is deemed acceptable. If the age is not within five percent of the exposure goal, then one can conclude that the age is more than five percent behind the exposure goal or, stated another way, that the age of BSF 24 exceeds the exposure goal by more than five percent. In that event, at step 68 evaluator task 28 determines whether there has been at least ten percent improvement in the difference between the age of that BSF 24 and the exposure goal over the difference between the age of the next least recently added BSF 24 and the exposure goal. A decrease in this difference indicates improvement because it indicates that the rate at which synchronization is occurring is catching up to the rate at which BSFs 24 are being added to sync list 26. If there has been at least ten percent improvement, processing proceeds directly to step 62 and sync capacity is not increased. If there has not been at least ten percent improvement, evaluator task 28 increases sync capacity at step 70 before proceeding to step 62. Steps 60 and 70 of increasing and decreasing sync capacity, respectively, are described below in further detail.

Note that the numerical parameters of five percent and ten percent are merely exemplary, and other values may be suitable.

At step 62 evaluator task 28 compares the age of the current BSF 24 to the exposure time. Evaluator task 28 maintains a pointer to one of BSFs 24 on sync list 26 (the "current" BSF 24). Each evaluation cycle evaluator task 28 moves this pointer to the next BSF 24 on sync list 26. At step 72 evaluator task 28 determines whether the age of the current BSF 24 is greater than the difference between the exposure goal and a lead time. Lead time is a parameter that represents a head-start or amount of time by which synchronization can be directed to precede the exposure time provided by the system operator. As described in further detail below, lead time is an adjustable parameter that provides fine as opposed to coarse adjustment of sync capacity. Other parameters, described below, provide coarser adjustment of sync capacity. Another important precept of the present invention is that it is more desirable to make finer adjustments than coarser adjustments to sync capacity because it is less disruptive to the computer system as a whole. Lead time is recorded in a sync table 73 (FIG. 3) along with other information used by the various tasks of the system.

If the age of the current BSF 24 is greater than the difference between the exposure goal and the lead time, evaluator task 28 sends a message to sync queue 54 to initiate synchronization of the current BSF 24. Evaluator task 28 also moves the pointer to the next BSF 24 in sync list 26. Processing then returns to step 62 to determine whether to initiate synchronization of another BSF 24 in this manner.

If the age of the current BSF 24 is not greater than the difference between the exposure goal and the lead time, evaluator task 28 waits at step 76 until either the end of the current evaluation interval or until the age is greater than or equal to the difference between the exposure goal and the lead time, whichever occurs first. If the current evaluation interval ends before the age of the current BSF 24 reaches this value, evaluator task 28 goes into a sleep state and wakes up to begin a new evaluation interval at step 52. If the age of the current BSF 24 reaches this value before the end of the current evaluation interval, at step 74 evaluator task 28 sends a message to sync queue 54 to initiate synchronization of the current BSF 24. In any event, it is preferred that evaluator task 28 wait at least one second or other suitable minimum wait interval at step 76.

Figure 7:
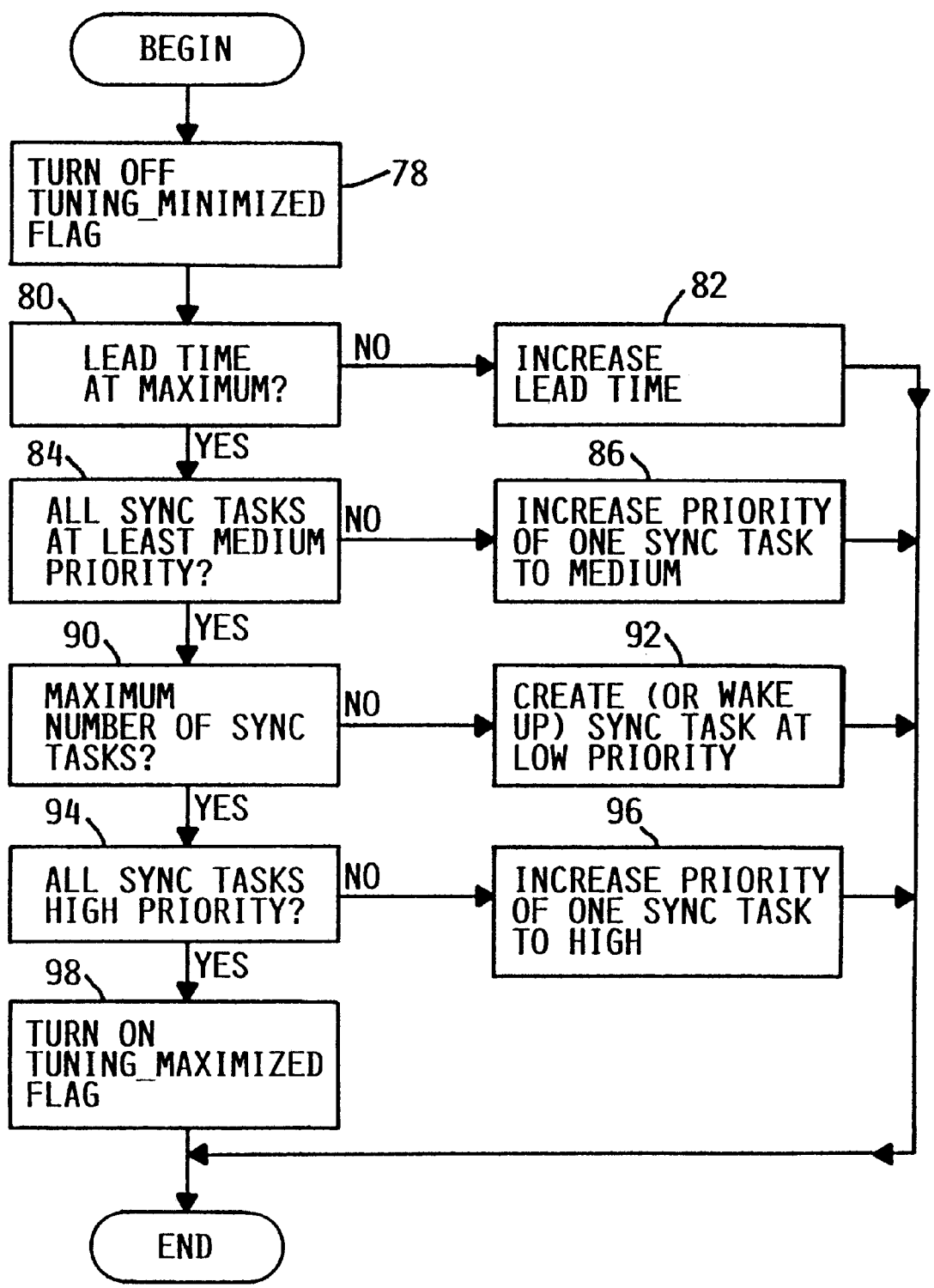
FIG. 7 is a flowchart illustrating the method by which the evaluator task increases synchronization capacity.

Increasing sync capacity in accordance with step 70 is illustrated by the flowchart of FIG. 7. At step 78 evaluator task 28 turns off or resets the tuning_minimized flag. At step 80 evaluator task 28 determines whether the lead time parameter, as recorded in sync table 73 (FIG. 3), is at its maximum value. The maximum may be any suitable predetermined value. If lead time is not at maximum, at step 82 evaluator task 28 increases the lead time. Lead time may be increased by any suitable increment, such as one second.

If lead time is at maximum, however, at step 84 evaluator task 28 determines whether all sync tasks 30 are at least medium priority. Priority is also sometimes known as dispatch priority in a computer system, and refers to the priority of a task with respect to other tasks for receiving the attention of the processor (e.g., CPU 18 in FIG. 1). Prioritizing tasks and affording tasks processor time on the basis of their priorities is well-known in the art and a common feature of computer operating systems. In the illustrated embodiment of the present invention, each sync task 30 can have one of three priorities: low, medium and high. Thus, if no sync tasks 30 have a medium or high priority, at step 86 evaluator task 28 increases the priority of one sync task 30 to medium priority. Evaluator task 28 increases and decreases priority of sync tasks 30 by sending an appropriate message to the control queue 88 (FIG. 3). Control queue 88 has four FIFO structures. Sync tasks 30 having a low priority look to the first FIFO structure for messages directed to them; sync tasks 30 having a medium priority look to the second FIFO structure for messages directed to them; sync tasks 30 having a high priority look to the third FIFO structure for messages directed to them; and sync tasks 30 in a sleep state look to the fourth FIFO structure for messages directed to them. Messages in the first FIFO structure may direct a sync task 30 to change to medium priority or enter a sleep state. Messages in the second FIFO structure may direct a sync task 30 to change to a low priority or to a high priority. Messages in the third FIFO structure may direct a sync task 30 to change to a medium priority. Messages in the fourth FIFO structure may direct a sync task 30 to wake up and assume a low priority. Nevertheless, other state changes between the various priorities and sleep state may be suitable.

If all sync tasks have a medium priority, at step 90 evaluator task 28 determines whether the maximum number of sync tasks 30 exists. The maximum may be any suitable predetermined value. If the number is not the maximum, at step 92 evaluator task 28 wakes up a sleeping sync task 30 or, if no sync tasks 30 are in a sleep state, creates a new sync task 30, by sending an appropriate message to control queue 88. This control over creation of sync tasks 30 is indicated by the wavy arrow in FIG. 3. Any suitable number of sync tasks 30 can exist simultaneously. Preferably, the system initially creates three sync tasks 30, all at low priority.

If the maximum number of sync tasks 30 exist, at step 94 evaluator task 28 determines whether all sync tasks 30 are at high priority. If not all sync tasks 30 have a high priority, at step 96 evaluator task 28 increases the priority of one sync task 30 by sending an appropriate message to control queue 88. If all sync tasks 30 are at high priority and the maximum number of sync tasks 30 have been started, at step 98 evaluator task 28 turns on or sets the tuning_maximized flag.

Figure 8:
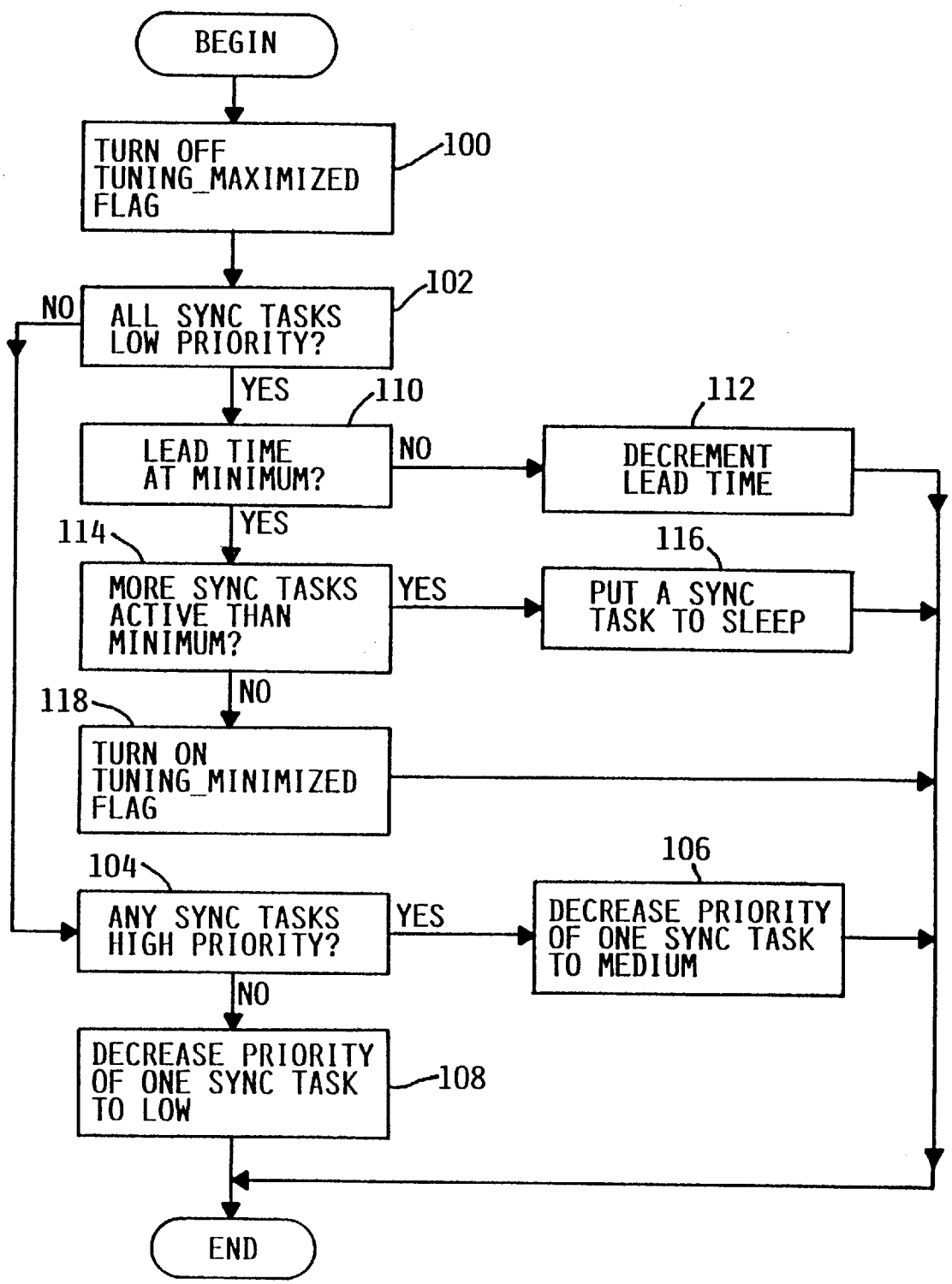
FIG. 8 is a flowchart illustrating the method by which the evaluator task decreases synchronization capacity.

Decreasing sync capacity in accordance with step 60 is illustrated by the flowchart of FIG. 8. At step 100 evaluator task 28 turns off or resets the tuning_maximized flag. At step 102 evaluator task 28 determines whether all sync tasks 30 are at low priority. If not all sync tasks 30 are at low priority, at step 104 evaluator task 28 determines whether any sync tasks 30 are at high priority. If at least one sync task 30 is at high priority, at step 106 evaluator task 28 decreases the priority of one such task to medium. If no sync tasks 30 are at high priority, at step 108 evaluator task 28 decreases the priority of one medium-priority sync task 30 to low priority.

If at step 102 evaluator task 28 determines that all sync tasks are at low priority, at step 110 it determines whether lead time is minimum. Like the maximum, the minimum lead time may be any suitable predetermined value. If lead time is not minimum, at step 112 evaluator task 28 decreases the lead time. Lead time may be decreased by any suitable amount, such as one second. If lead time is minimum, at step 114 evaluator task 28 determines whether the number of sync tasks 30 that are active, i.e., that exist and are not in a sleep state, exceeds a minimum. Like other maximum, minima and other predetermined values described in this patent specification, the maximum and minimum number of sync tasks 30 can be any suitable value. If more than the minimum number of sync tasks 30 are active, at step 116 evaluator task 28 puts one sync task 30 to sleep by sending the appropriate message to control queue 88. If only the minimum number of sync tasks 30 are active, at step 118 evaluator 28 turns on or sets the tuning$_{13}$ minimized flag.

The above described steps of increasing and decreasing sync capacity reflect the belief that it is more desirable to make finer adjustments than coarser adjustments to sync capacity because it is less disruptive to the computer system as a whole. Adjusting the priority of a task is perhaps the most disruptive or coarsest adjustment that can be made because it may greatly affect the overall performance of the computer system. Adjusting the number of sync tasks is less disruptive. Adjusting the lead time is less disruptive still, and is used to finely tune sync capacity. Accordingly, to increase sync capacity it is preferable to first attempt to adjust lead time, and if not possible, then attempt to increase the priority of low-priority sync tasks 30 to medium, and if that is not possible, then add sync tasks 30 until a maximum number is reached, and then only when that point is reached attempt to increase the priority of medium-priority sync tasks 30. Priority is adjusted to minimize the number of sync tasks 30 at higher priorities. Although this is the preferred hierarchy or order of adjustments, in other embodiments it may be suitable to, for example, first attempt to adjust the number of sync tasks 30, then attempt to adjust lead time, and then attempt to adjust priority, or any other suitable order. Indeed, in other embodiments evaluator task 28 may adjust sync capacity by adjusting parameters other than or in addition to lead time, number of sync tasks and priority.

Figure 5:
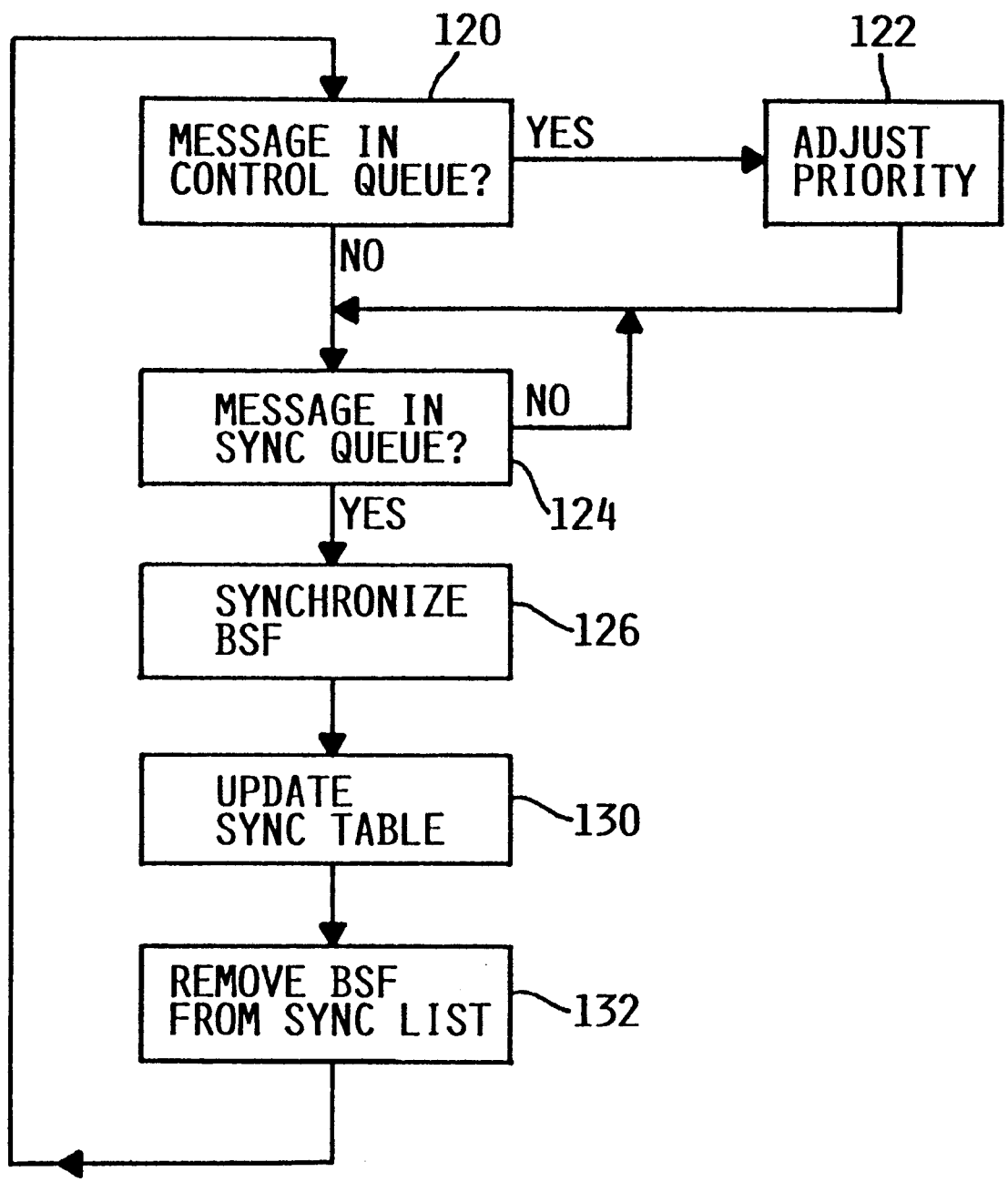
FIG. 5 is a flowchart illustrating the operation of a synchronization task of FIG. 3.

As illustrated by the flowchart of FIG. 5, each active sync task 30 attempts to complete a synchronization. At step 120 sync task 30 determines whether a message exists in control queue 88 that instructs it to adjust its priority and, if so, adjusts its priority accordingly at step 122. At step 124 sync task 30 determines whether a message exists in sync queue 54 and, if not, waits on the sync queue (in a manner that does not consume CPU time) until such a message arrives. When such a message is found, at step 126 sync task 30 synchronizes the BSF 24 in sync list 26 to which the message points (see FIG. 3). Sync task 30 performs this synchronization by invoking the services of the OS/400 storage management services mechanism 128 (FIG. 3). It is storage management services mechanism 128 that controls the writing of data to DASD 12. Sync task 30 then updates sync table 73 at step 130 by storing statistical information, such as the time-stamp of the BSF 24 that was synchronized and the time of day at which its synchronization, i.e, the writing of it to DASD 12, was completed. The information may also include the number of bytes written to DASD 12. Sync table 73 records this information for the five most recent synchronizations as a means for a system operator or other personnel to evaluate the operation of the synchronization system. Nevertheless, in other embodiments this historical information could be used as a basis for further refining the evaluation process. For example, evaluator task 28 could use the information to determine whether synchronization is increasingly falling behind the rate at which new BSFs 24 are added to sync list 26 and make adjustments as necessary by increasing lead time, priority, etc. At step 132 sync task 30 removes the BSF 24 that it synchronized from sync list 26.

As described above with respect to FIG. 2, when a user unmounts a file system or when a power-down of the computer system occurs, a flush queue 134 and at least one flush task 136 (FIG. 3) are created. Flush queue 134 is similar in structure and function to sync queue 54 in that it is a FIFO-based structure that stores messages, and each message points to one of BSFs 24 in sync list 26. Nevertheless, flush queue 134 is used in the illustrated embodiment only in response to detection of a file system un-mount or system power-down. In other embodiments flush queue 134 and flush tasks 136 could be used whenever a user desires to "flush" or quickly synchronize all BSFs 24.

Figure 6:
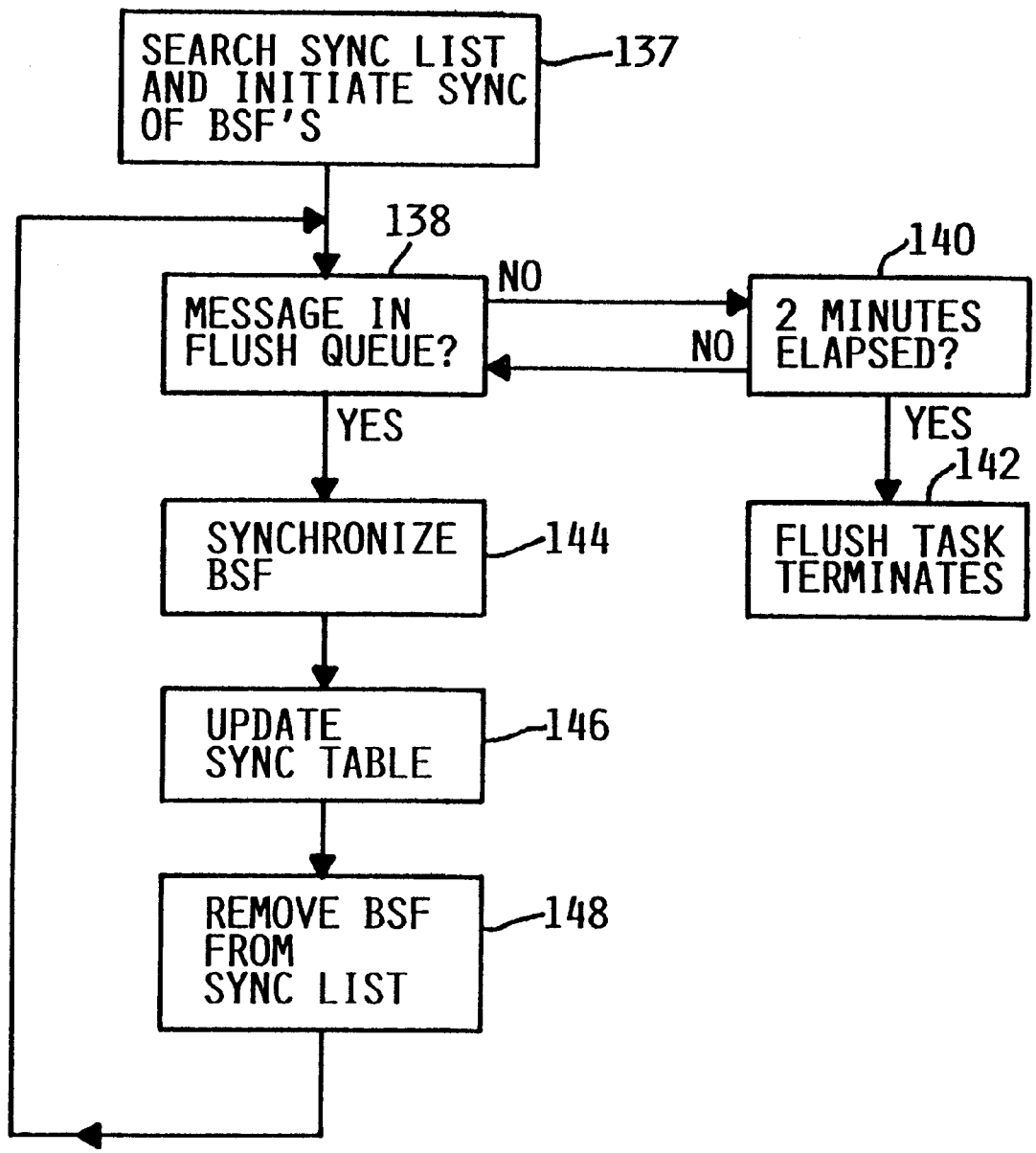
FIG. 6 is a flowchart illustrating the operation of the flush task of FIG. 3.

Flush task 136 is similar in structure and function to sync task 30 in that they both complete the synchronization. Nevertheless, flush task 136 only responds to messages in flush queue 134. As illustrated by the flowchart of FIG. 6, at step 137 flush task 136 initiates synchronization of BSFs 24 of the file system type being unmounted. To do this, flush task 136 searches sync list 26 for BSFs 24 of that file type. Flush task 136 sends a message to flush queue 134 to sync each such BSF 24 that it finds. At step 138 a flush task 138 determines whether there is a message in flush queue 134. If there is no message, at step 140 flush task 136 waits until a message is present, up to a maximum of two minutes. If no message is received within two minutes, flush task 136 terminates at step 142. In response to a message in flush queue 134, flush task 136 synchronizes the current BSF 24 at step 144, updates sync table 73 at step 146, and removes BSF 24 from sync list 26 at step 148, all as described above with respect to sync task 30.

Although not illustrated for purposes of clarity, the above-described tasks also preferably include steps for checking the integrity and validity of messages they receive. Such error-checking is routine software engineering practice and is therefore not described above.

The present invention avoids or minimizes spikes in system workload and adapts to changes in synchronization needs. The system minimizes its impact on the computer system workload by spreading synchronization over time as a result of evaluating synchronization at periodic intervals and deferring the initiation of synchronization when it can be done without falling behind the rate at which new files need to be synchronized. The system adapts to changing synchronization needs by increasing or decreasing sync capacity in an attempt to neither exceed nor fall short of an exposure goal provided by the system operator. The system further minimizes its impact on system dynamics by making only the minimum adjustments to sync capacity that may achieve the intended increase or decrease.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. In an operating system of a computer, a method for synchronizing byte stream files to a direct-access storage device, comprising the steps of:

detecting alteration of a byte stream file in a main memory of said computer, said alteration not yet reflected in a copy of said byte stream file stored in a non-volatile direct access storage medium at a time said alteration is detected;

adding information identifying said byte stream file having said alteration to a synchronization list;

evaluating, at a predetermined interval, an age represented by a time difference between a byte stream file identified in said synchronization list and a predetermined exposure goal;

adjusting a sync capacity in response to said age of a byte stream file identified in said synchronization list; and initiating synchronization of a byte stream file identified in said synchronization list in response to said age and said exposure goal, synchronization of byte stream files occurring at rates responsive to said sync capacity.

2. The method recited in claim 1, wherein:

said step of adjusting a sync capacity comprises the step of adjusting a lead time, said step of initiating synchronization of a byte stream file occurs more frequently in response to a longer lead time and occurs less frequently in response to a shorter lead time; and said step of initiating synchronization of a byte stream file identified in said synchronization list comprises the steps of:

immediately initiating synchronization if said age of said byte stream file identified in said synchronization list is greater than a time difference between said exposure goal and said lead time; and waiting to initiate synchronization if said age of said byte stream file identified in said synchronization list is less than or equal to a time difference between said exposure goal and said lead time.

3. The method recited in claim 2, wherein said step of waiting to initiate synchronization comprises the step of waiting until said age of said byte stream file identified in said synchronization list reaches a value equal to said difference between said exposure goal and said lead time before an end of said predetermined interval at which said evaluating step occurs.

4. The method recited in claim 1, wherein:

said step of adjusting a sync capacity comprises the step of adjusting a lead time, wherein said step of initiating synchronization of a byte stream file occurs more frequently in response to a longer lead time and occurs less frequently in response to a shorter lead time.

5. The method recited in claim 1, wherein said step of adjusting a sync capacity comprises the step of adjusting a system priority of a sync task that performs synchronization of byte stream files.

6. The method recited in claim 1, wherein said step of adjusting a sync capacity comprises the step of adjusting a number of sync tasks that perform synchronization of byte stream files.

7. The method recited in claim 1, wherein said step of adjusting a sync capacity in response to said age of a byte stream file identified in said synchronization list comprises the steps of:

decreasing said sync capacity if said exposure goal exceeds said age of a byte stream file of which synchronization has been initiated by more than a predetermined percentage; and increasing said sync capacity if said age of a byte stream file of which synchronization has been initiated exceeds said exposure goal by more than a predetermined percentage.

8. The method recited in claim 7, wherein said step of increasing said sync capacity is not performed if said age of a byte stream file of which synchronization has been initiated exceeds said age of another byte stream file of which synchronization has been initiated by more than a predetermined percentage.

9. The method recited in claim 7, wherein said step of increasing said sync capacity comprises the steps of:

determining a lead time, wherein said step of initiating synchronization of a byte stream file occurs more frequently in response to a longer lead time and occurs less frequently in response to a shorter lead time;

increasing said lead time if it is determined that said lead time is less than a predetermined maximum;

determining whether any sync tasks are less than a first predetermined level of system priority if it is determined that said lead time is equal to a predetermined maximum;

increasing a system priority of one sync task if it is determined that any sync tasks have less than said first predetermined level of system priority;

determining whether less than a predetermined maximum number of sync tasks exist if it is determined that no sync tasks have less than said first predetermined level of system priority;

creating an additional sync task if it is determined that less than a predetermined maximum number of sync tasks exist;

determining whether all sync tasks have at least a second predetermined level of system priority if it is determined that said predetermined maximum number of sync tasks exist; and increasing a system priority of one sync task if it is determined that all sync tasks have at least said second predetermined level of system priority.

10. The method recited in claim 7, wherein said step of decreasing said sync capacity comprises the steps of:

determining whether any sync tasks have greater than a first predetermined level of system priority;

determining whether a lead time is at a predetermined minimum if it is determined that no sync tasks have greater than a first predetermined level of system priority, said wherein said step of initiating synchronization of a byte stream file occurs more frequently in response to a longer lead time and occurs less frequently in response to a shorter lead time;

decreasing said lead time if it is determined that said lead time is not at said predetermined minimum value;

putting a sync task into a sleep state if more than a predetermined minimum number of sync tasks exist and if it is determined that said lead time is at said predetermined minimum value;

determining if any sync task has greater than a second predetermined level of system priority greater than said first predetermined level if it is determined that any sync task has greater than said first predetermined level of system priority;

decreasing a system priority of one sync task having a system priority greater than or equal to said second predetermined level to a third predetermined level of system priority between said first and second predetermined levels if it is determined that any sync task has greater than said second predetermined level of system priority; and decreasing a system priority of one sync task to said first predetermined level of system priority if it is determined that no sync task has a system priority greater than or equal to said second predetermined level.

11. A system in an operating system of a computer for synchronizing byte stream files to a direct-access storage device, comprising:

a synchronization list on which is stored information identifying an alteration of a byte stream file detected by said operating system, said alteration not yet reflected in a copy of said byte stream file stored in a non-volatile direct access storage medium at a time said alteration is detected;

an evaluator task evaluating, during an evaluation cycle occurring at a predetermined interval, an age represented by a time difference between a byte stream file identified in said synchronization list and a predetermined exposure goal, said evaluator task adjusting a sync capacity in response to said age of a byte stream file identified in said synchronization list, said evaluator task initiating a synchronization of a byte stream file identified by said information in said synchronization list in response to said age and said exposure goal; and one or more synchronization tasks collectively synchronizing byte stream files in said synchronization list for which synchronization has been initiated at rates responsive to said sync capacity, synchronization of byte stream files occurring at rates responsive to said sync capacity.

12. The system recited in claim 11, wherein:

said evaluator task adjusts a lead time and initiates synchronization of a byte stream file more frequently in response to a longer lead time and less frequently in response to a shorter lead time, said evaluator task immediately initiates synchronization if said age of said byte stream file identified in said synchronization list is greater than a time difference between said exposure goal and said lead time, and said evaluator task waits to initiate synchronization if said age of said byte stream file identified in said synchronization list is less than or equal to a time difference between said exposure goal and said lead time.

13. The system recited in claim 12, wherein if said evaluator task waits to initiate synchronization it waits until said age of said byte stream file identified in said synchronization list reaches a value equal to said difference between said exposure goal and said lead time before an end of said predetermined interval at which said evaluating step occurs.

14. The system recited in claim 11, wherein said evaluator task adjusts sync capacity by adjusting a lead time and initiates synchronization of a byte stream file more frequently in response to a longer lead time and less frequently in response to a shorter lead time.

15. The system recited in claim 11, wherein said evaluator task adjusts sync capacity by adjusting a system priority of a sync task that performs synchronization of byte stream files.

16. The system recited in claim 11, wherein said evaluator task adjusts sync capacity by adjusting a number of sync tasks that perform synchronization of byte stream files.

17. The system recited in claim 11, wherein said evaluator task adjusts sync capacity by decreasing said sync capacity if said exposure goal exceeds said age of a byte stream file of which synchronization has been initiated by more than a predetermined percentage, and increasing said sync capacity if said age of a byte stream file of which synchronization has been initiated exceeds said exposure goal by more than a predetermined percentage.

18. The system recited in claim 17, wherein said evaluator task does not increase sync capacity if an age of a byte stream file of which synchronization has been initiated exceeds said age of another byte stream file of which synchronization has been initiated by more than a predetermined percentage.

19. The system recited in claim 17, wherein said evaluator task increases said sync capacity by determining a lead time, said evaluator task initiating synchronization of a byte stream file more frequently in response to a longer lead time and less frequently in response to a shorter lead time, said evaluator task increasing said lead time if it is determined that said lead time is less than a predetermined maximum, said evaluator task determining whether any sync tasks are less than a first predetermined level of system priority if it is determined that said lead time is equal to a predetermined maximum, said evaluator task increasing a system priority of one sync task if it is determined that any sync tasks have less than said first predetermined level of system priority, said evaluator task determining whether less than a predetermined maximum number of sync tasks exist if it is determined that no sync tasks have less than said first predetermined level of system priority, said evaluator task creating an additional sync task if it is determined that less than a predetermined maximum number of sync tasks exist, said evaluator task determining whether all sync tasks have at least a second predetermined level of system priority if it is determined that said predetermined maximum number of sync tasks exist, and said evaluator task increasing a system priority of one sync task if it is determined that all sync tasks have at least said second predetermined level of system priority.

20. The system recited in claim 17, wherein said evaluator task decreases said sync capacity by determining whether any sync tasks have greater than a first predetermined level of system priority, said evaluator task determining whether a lead time is at a predetermined minimum if it is determined that no sync tasks have greater than a first predetermined level of system priority, said wherein said step of initiating synchronization of a byte stream file occurs more frequently in response to a longer lead time and occurs less frequently in response to a shorter lead time, said evaluator task decreasing said lead time if it is determined that said lead time is not at said predetermined minimum value, said evaluator task putting a sync task into a sleep state if more than a predetermined minimum number of sync tasks exist and if it is determined that said lead time is at said predetermined minimum value, said evaluator task determining if any sync task has greater than a second predetermined level of system priority greater than said first predetermined level if it is determined that any sync task has greater than said first predetermined level of system priority, said evaluator task decreasing a system priority of one sync task having a system priority greater than or equal to said second predetermined level to a third predetermined level of system priority between said first and second predetermined levels if it is determined that any sync task has greater than said second predetermined level of system priority, and said evaluator task decreasing a system priority of one sync task to said first predetermined level of system priority if it is determined that no sync task has a system priority greater than or equal to said second predetermined level.

21. A computer program product for a computer operating system for synchronizing byte stream files to a direct-access storage device, comprising at least one signal-bearing medium carrying in computer-detectable format thereon:
   a synchronization list on which is stored information identifying an alteration of a byte stream file detected by said operating system, said alteration not yet reflected in a copy of said byte stream file stored in a non-volatile direct access storage medium at a time said alteration is detected;
   an evaluator task evaluating, during an evaluation cycle occurring at a predetermined interval, an age represented by a time difference between a byte stream file identified in said synchronization list and a predetermined exposure goal, said evaluator task adjusting a sync capacity in response to said age of a byte stream file identified in said synchronization list, said evaluator task initiating a synchronization of a byte stream file identified by said information in said synchronization list in response to said age and said exposure goal; and
   one or more synchronization tasks collectively synchronizing byte stream files in said synchronization list for which synchronization has been initiated at rates responsive to said sync capacity, synchronization of byte stream files occurring at rates responsive to said sync capacity.

22. The computer program product recited in claim 21, wherein:
   said evaluator task adjusts a lead time and initiates synchronization of a byte stream file more frequently in response to a longer lead time and less frequently in response to a shorter lead time, said evaluator task immediately initiates synchronization if said age of said byte stream file identified in said synchronization list is greater than a time difference between said exposure goal and said lead time, and said evaluator task waits to initiate synchronization if said age of said byte stream file identified in said synchronization list is less than or equal to a time difference between said exposure goal and said lead time.

23. The computer program product recited in claim 12, wherein if said evaluator task waits to initiate synchronization it waits until said age of said byte stream file identified in said synchronization list reaches a value equal to said difference between said exposure goal and said lead time before an end of said predetermined interval at which said evaluating step occurs.

24. The computer program product recited in claim 21, wherein said evaluator task adjusts sync capacity by adjusting a lead time and initiates synchronization of a byte stream file more frequently in response to a longer lead time and less frequently in response to a shorter lead time.

25. The computer program product recited in claim 21, wherein said evaluator task adjusts sync capacity by adjusting a system priority of a sync task that performs synchronization of byte stream files.

26. The computer program product recited in claim 21, wherein said evaluator task adjusts sync capacity by adjusting a number of sync tasks that perform synchronization of byte stream files.

27. The computer program product recited in claim 11, wherein said evaluator task adjusts sync capacity by decreasing said sync capacity if said exposure goal exceeds said age of a byte stream file of which synchronization has been initiated by more than a predetermined percentage, and increasing said sync capacity if said age of a byte stream file of which synchronization has been initiated exceeds said exposure goal by more than a predetermined percentage.

28. The computer program product recited in claim 27, wherein said evaluator task does not increase sync capacity if said age of a byte stream file of which synchronization has been initiated exceeds said age of another byte stream file of which synchronization has been initiated by more than a predetermined percentage.

29. The computer program product recited in claim 27, wherein said evaluator task increases said sync capacity by determining a lead time, said evaluator task initiating synchronization of a byte stream file more frequently in response to a longer lead time and less frequently in response to a shorter lead time, said evaluator task increasing said lead time if it is determined that said lead time is less than a predetermined maximum, said evaluator task determining whether any sync tasks are less than a first predetermined level of system priority if it is determined that said lead time is equal to a predetermined maximum, said evaluator task increasing a system priority of one sync task if it is determined that any sync tasks have less than said first predetermined level of system priority, said evaluator task determining whether less than a predetermined maximum number of sync tasks exist if it is determined that no sync tasks have less than said first predetermined level of system priority, said evaluator task creating an additional sync task if it is determined that less than a predetermined maximum number of sync tasks exist, said evaluator task determining whether all sync tasks have at least a second predetermined level of system priority if it is determined that said predetermined maximum number of sync tasks exist, and said evaluator task increasing a system priority of one sync task if it is determined that all sync tasks have at least said second predetermined level of system priority.

30. The computer program product recited in claim 27, wherein said evaluator task decreases said sync capacity by determining whether any sync tasks have greater than a first predetermined level of system priority, said evaluator task determining whether a lead time is at a predetermined minimum if it is determined that no sync tasks have greater than a first predetermined level of system priority, said wherein said step of initiating synchronization of a byte stream file occurs more frequently in response to a longer lead time and occurs less frequently in response to a shorter lead time, said evaluator task decreasing said lead time if it is determined that said lead time is not at said predetermined minimum value, said evaluator task putting a sync task into a sleep state if more than a predetermined minimum number of sync tasks exist and if it is determined that said lead time is at said predetermined minimum value, said evaluator task determining if any sync task has greater than a second predetermined level of system priority greater than said first predetermined level if it is determined that any sync task has greater than said first predetermined level of system priority, said evaluator task decreasing a system priority of one sync task having a system priority greater than or equal to said second predetermined level to a third predetermined level of system priority between said first and second predetermined levels if it is determined that any sync task has greater than said second predetermined level of system priority, and said evaluator task decreasing a system priority of one sync task to said first predetermined level of system priority if it is determined that no sync task has a system priority greater than or equal to said second predetermined level.

* * * * *